United States Patent
Cook et al.

(10) Patent No.: US 10,642,583 B2
(45) Date of Patent: May 5, 2020

(54) DEVELOPMENT DATA MANAGEMENT FOR A STREAM COMPUTING ENVIRONMENT

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 15/338,110

(22) Filed: Oct. 28, 2016

(65) Prior Publication Data
US 2018/0121176 A1 May 3, 2018

(51) Int. Cl.
*G06F 8/41* (2018.01)
*G06F 8/33* (2018.01)
*G06F 8/75* (2018.01)

(52) U.S. Cl.
CPC .............. *G06F 8/41* (2013.01); *G06F 8/33* (2013.01); *G06F 8/75* (2013.01)

(58) Field of Classification Search
CPC ....................................................... G06F 8/41
USPC ......................................................... 717/140
See application file for complete search history.

(56) References Cited

U.S. PATENT DOCUMENTS

| 7,657,876 | B2 | 2/2010 | Chilimbi |
| 8,413,125 | B2* | 4/2013 | Lee ................ G06F 8/4441 717/148 |
| 8,589,859 | B2 | 11/2013 | Kaulgud et al. |
| 8,621,417 | B2 | 12/2013 | Kaulgud et al. |
| 8,813,040 | B2 | 8/2014 | Holler et al. |
| 8,943,010 | B2 | 1/2015 | Hutson et al. |
| 9,372,780 | B2 | 6/2016 | Barsness et al. |
| 2003/0005415 | A1* | 1/2003 | Bates ................ G06F 11/362 717/129 |
| 2003/0046681 | A1* | 3/2003 | Barturen ............. G06F 8/71 717/177 |
| 2003/0182320 | A1* | 9/2003 | Lai ....................... G06F 8/71 |
| 2006/0123389 | A1* | 6/2006 | Kolawa ............ G06F 11/3616 717/101 |
| 2009/0119644 | A1* | 5/2009 | de Vries .......... G06F 11/3476 717/123 |

(Continued)

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>. Mar. 6, 2016.

(Continued)

*Primary Examiner* — James D. Rutten
(74) *Attorney, Agent, or Firm* — Peter J. Edwards

(57) ABSTRACT

Disclosed aspects relate to managing a set of development data for a stream computing environment. A set of development data related to a computing object may be detected. The set of development data may be derived from application development for utilization in the stream computing environment. The set of development data may be established in association with the computing object. A computing artifact which has the computing object in association with the set of development data may be compiled.

18 Claims, 10 Drawing Sheets

(56) References Cited

U.S. PATENT DOCUMENTS

| | | |
|---|---|---|
| 2012/0221890 A1 | 8/2012 | Das |
| 2013/0031534 A1 | 1/2013 | Bates |
| 2013/0074038 A1* | 3/2013 | Fox .................. G06F 8/70 717/122 |
| 2013/0086547 A1 | 4/2013 | Said et al. |
| 2013/0212562 A1* | 8/2013 | Fox .................. G06F 8/65 717/120 |
| 2013/0275185 A1 | 10/2013 | Dan et al. |
| 2013/0311968 A1* | 11/2013 | Sharma ............ G06Q 10/06 717/101 |
| 2014/0089929 A1* | 3/2014 | Branson .......... H04L 29/08135 718/102 |
| 2014/0136724 A1 | 5/2014 | Branson et al. |
| 2014/0278337 A1* | 9/2014 | Branson ............ G06F 11/3457 703/22 |
| 2015/0007143 A1* | 1/2015 | Barsness .......... G06F 11/3636 717/129 |
| 2016/0077809 A1 | 5/2016 | Heyhoe et al. |

OTHER PUBLICATIONS

Cito et al.; "Runtime Metrics Meets Developer: Building Better Cloud Applications Using Feedback"; <https://peerj.com/preprints/985.pdf>. Apr. 2015.

Kou, "Studying Micro-Processes in Software Development Stream", Collaborative Software Development Laboratory Department of Information and Computer Sciences, University of Hawaii, Jul. 1, 2005, 7 pages.

* cited by examiner

--Prior Art--

DEVELOPMENT DATA MANAGEMENT FOR A STREAM COMPUTING ENVIRONMENT

BACKGROUND

This disclosure relates generally to computer systems and, more particularly, relates to managing development data for a stream computing environment. The amount of data that needs to be managed by enterprises is increasing. Management of development data may be desired to be performed as efficiently as possible. As data needing to be managed increases, the need for management efficiency may increase.

SUMMARY

Aspects of the disclosure relate to managing a set of development data for a stream computing environment. During the code development process, certain portions of code may be associated with development information that relate to how the code was developed. For instance, portions of code may be associated with development information that indicates a code repository log history, a debugger or integrated development environment history, or test framework history. Based on the development data for the code, host deployment decisions, stream operator fusion decisions, and other usage configurations for the code may be determined. Leveraging development data for a stream computing environment may be associated with development efficiency, code reliability, and stream application performance.

Disclosed aspects relate to managing a set of development data for a stream computing environment. A set of development data related to a computing object may be detected. The set of development data may be derived from application development for utilization in the stream computing environment. The set of development data may be established in association with the computing object. A computing artifact which has the computing object in association with the set of development data may be compiled.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
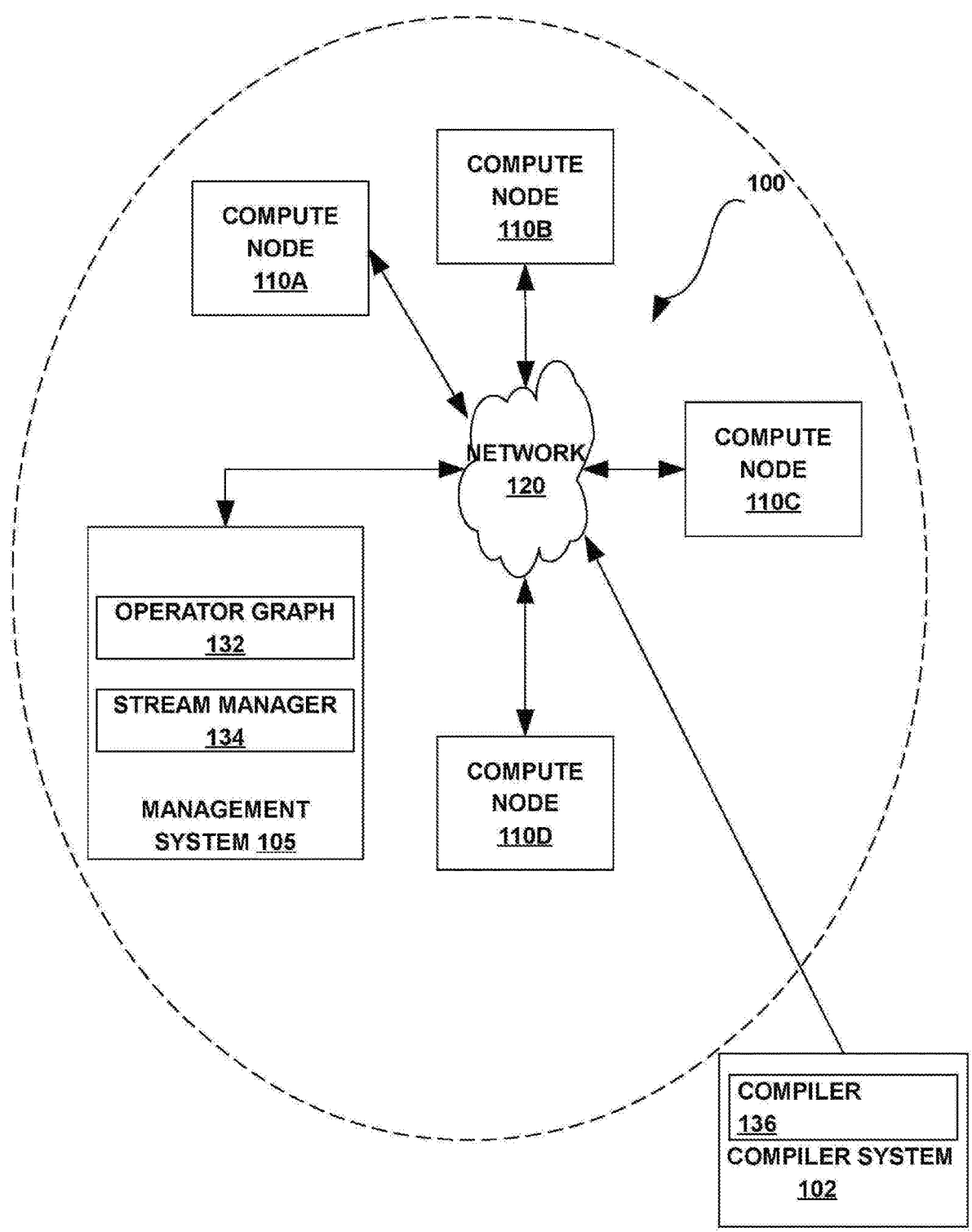
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a set of development data for a stream computing environment. During the code development process, certain portions of code may be associated with development information that relate to how the code was developed. For instance, portions of code may be associated with development information that indicates a code repository log history (e.g., check-in and check-out frequency, feature requests), a debugger or integrated development environment history (e.g., code change frequency, extent of code changes, breakpoint usage), or test framework history (e.g., how many/what tests have been performed with respect to the code). Based on the development data for the code, host deployment decisions, stream operator fusion decisions, and other usage configurations for the code may be determined. Leveraging development data for a stream computing environment may be associated with development efficiency, code reliability, and stream application performance.

Aspects of the disclosure relate to managing code fusion and deployment for a stream computing environment based on development data for one or more computing objects. The streaming operators, host compute nodes, and other computing resources that may be used in association with the computing objects may be determined based on the development data (e.g., code source information, code debug information, code test information). In embodiments, metadata that indicates development data for a particular computing object may be detected and established with the computing object to compile a computing artifact that includes both a computing object as well as the associated development data. Based on the development data, operator fusion, code processing, exception handling, operator assignment, code deployment, and other code management decisions may be determined. As such, development data for a stream computing environment may facilitate application deployment (e.g., to host computing devices) and code fusion operations for a streaming application.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to a system, method, and computer program product for managing a set of development data for a stream computing environment. A set of development data related to a computing object may be detected. The set of development data may be derived from application development for utilization in a stream computing environment. In embodiments, the computing object may include a set of implementation code, and application development may include construction of implementation code or configuration of a set of parameters. The set of development data may be established in association with the computing object. In embodiments, a compilation action may be determined based on the set of development data. A computing artifact which has the computing object in association with the set of development data may be compiled. In embodiments, an execution action may be determined and performed using the set of development data. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
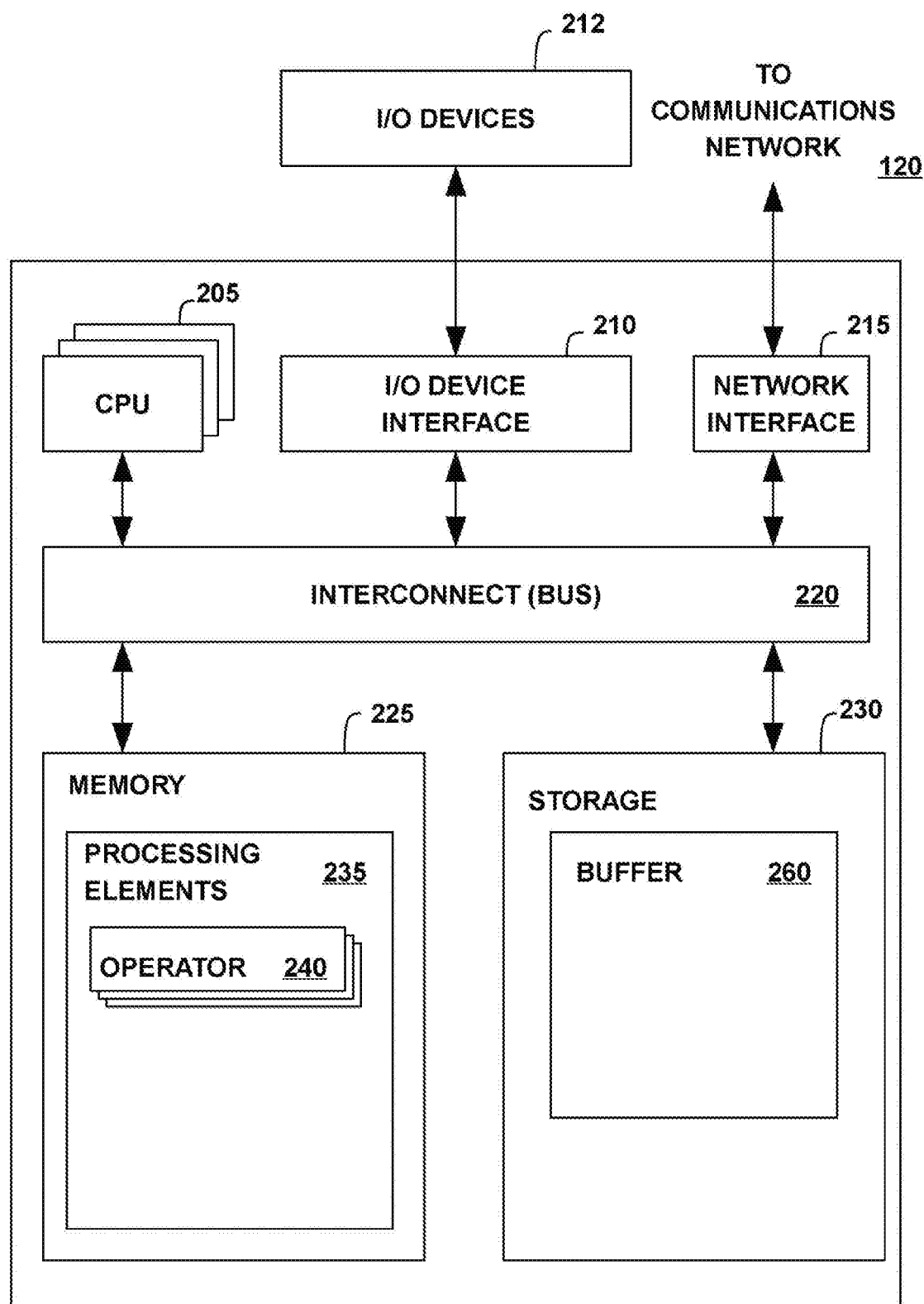
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
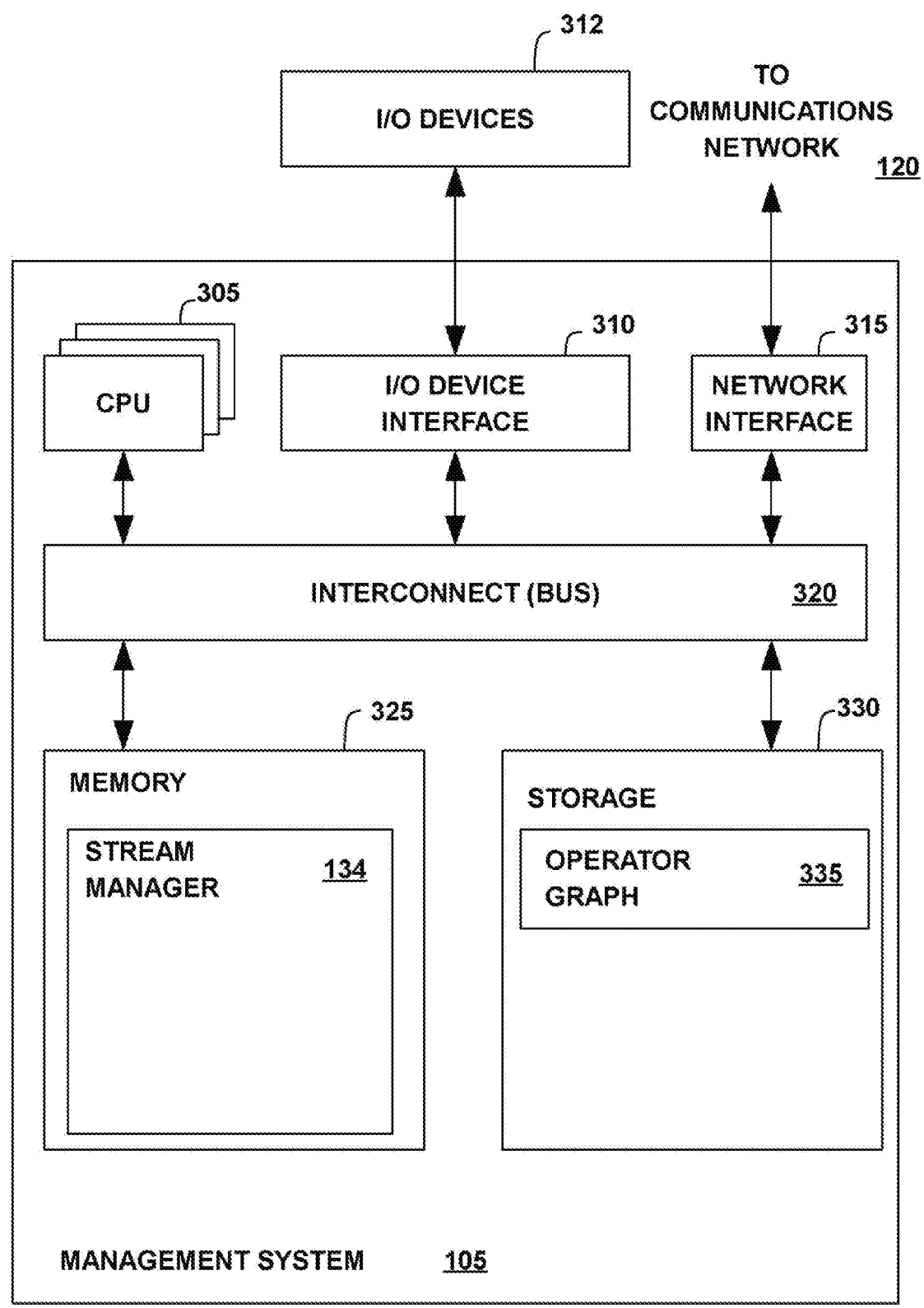
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
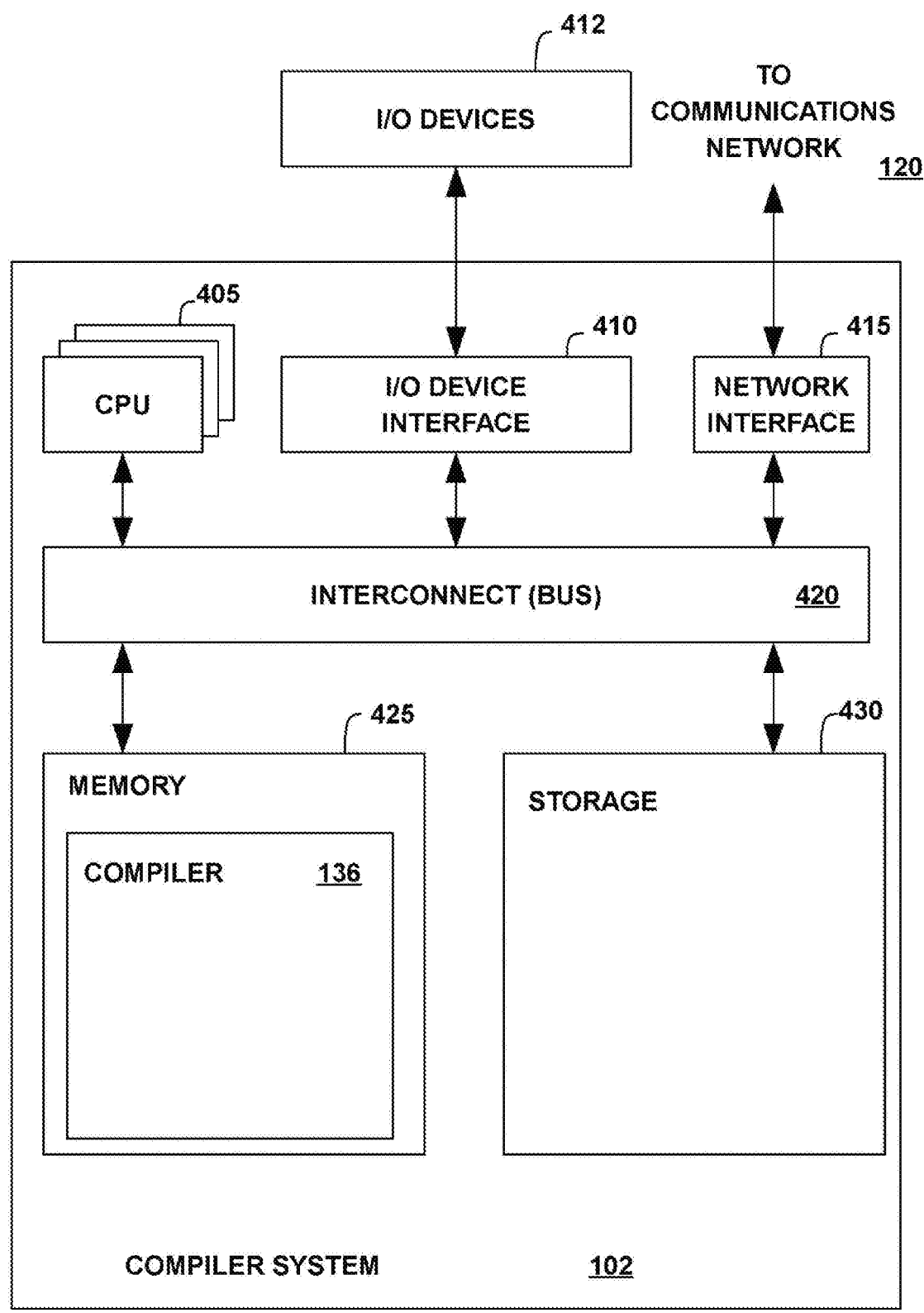
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
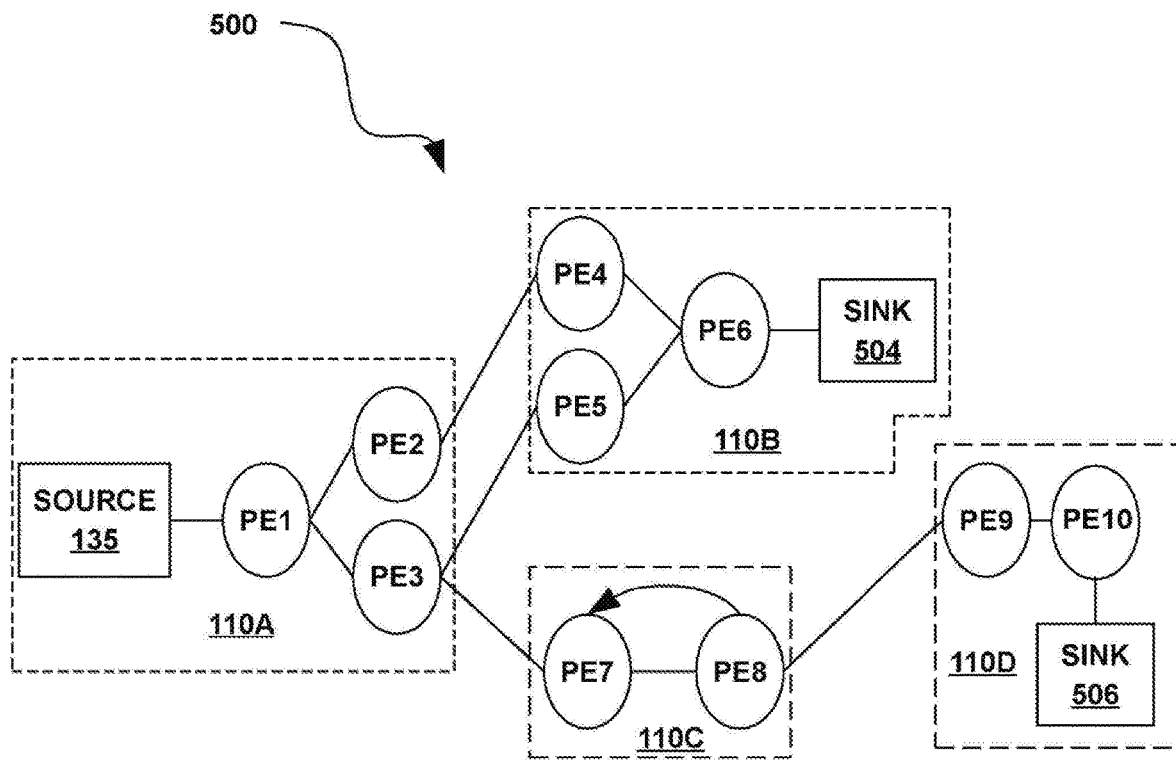
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
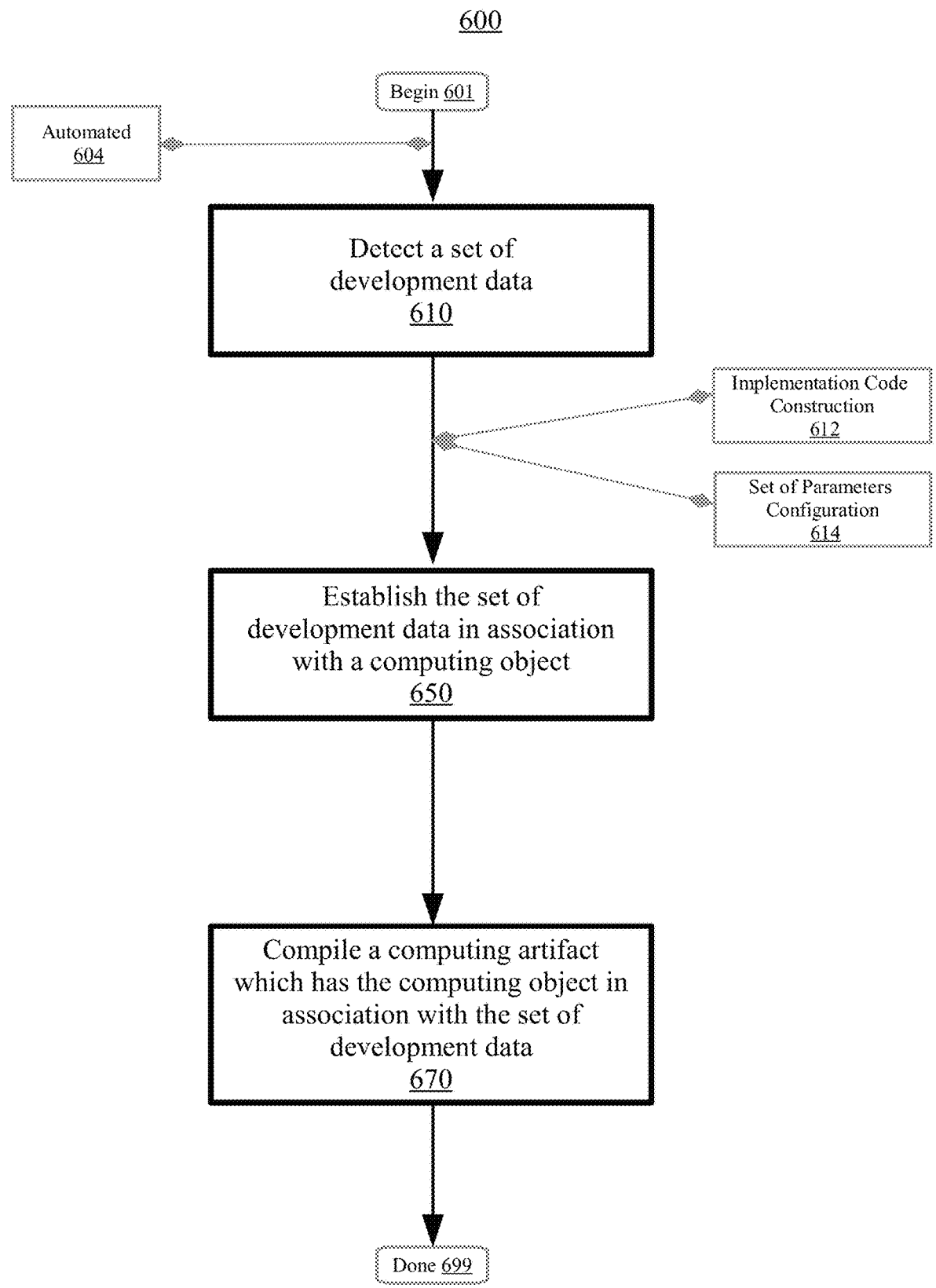
FIG. 6 is a flowchart illustrating a method for managing a set of development data for a stream computing environment, according to embodiments.

FIG. 6 is a flowchart illustrating a method 600 for managing a set of development data for a stream computing environment, according to embodiments. Aspects of FIG. 6 relate to generating a computing artifact that includes a computing object in association with a set of (historical) development data to facilitate streaming application development and performance. The stream computing environment may include a distributed network of compute nodes. Generally, compute nodes may include a shared pool of configurable computing resources configured to operate in a public cloud environment, a private cloud environment, a hybrid cloud environment, or other distributed computing environment. In certain embodiments, each of the set of compute nodes may be physically separate from one another. In embodiments, the stream computing environment may be configured to facilitate operation of a stream computing application. The streaming application can include a software program, digital package, executable file, or other set of computer instructions configured to process streams of data (e.g., tuples) in a distributed computing environment. In embodiments, the streaming application may include one or more computing objects. The computing objects may include a set, portion, or line of implementation code, a code location, code toolkit, or other aspect of the implementation code that is included in the streaming application. For example, the computing object may include a software module configured to invoke a particular operation or function within the streaming application. Other types of streaming applications and computing objects are also possible. Leveraging development data for a stream computing environment may be associated with development efficiency, code reliability, and stream application performance. The method 600 may begin at block 601.

In embodiments, the detecting, the establishing, the compiling, and other steps described herein may each occur in an automated fashion without user intervention at block 604. In embodiments, the detecting, the establishing, the compiling, and other steps described herein may be carried out by an internal development data management module maintained in a persistent storage device of a local computing device (e.g., computer or server connected to a local network). In certain embodiments, the detecting, the establishing, the compiling, and other steps described herein may be carried out by an external development data management module hosted by a remote computing device or server (e.g., server accessible via a subscription, usage-based, or other service model). In this way, aspects of historical development data management may be performed using automated computing machinery without manual action. Other methods of performing the steps described herein are also possible.

At block 610, a set of development data related to a computing object may be detected. The set of development data may be derived from application development for utilization in the stream computing environment. Generally, detecting can include monitoring, recognizing, discerning, or otherwise discovering the set of development data. The development data can include information (e.g., development logs, meta data tags, test results, developer comments) that indicates the context, environment, development tools, background, techniques, and other data regarding how a computing object was developed. As examples, the development data may include a set of code source information (e.g, code repository logs, number of feature requests), a set of code debug information (e.g., code modification frequency, modification extent, breakpoint usage), a set of code test information (e.g., how many and what type of tests were performed on the code), or other types of data. As described herein, detecting may include deriving the set of (historical) development data from application development. In embodiments, detecting may include monitoring the computing object and identifying historical development data that occurs with respect to one or more aspects of programming code (e.g., code check-in/check-out from a repository, tests performed, debugging operations). In embodiments, detecting may include analyzing a computing object (e.g., portion of source code) and ascertaining that the computing object is associated with one or more types of historical development data. For instance, a code diagnostic tool (e.g., static code analyzer) may be used to scan a source code file and identify a metadata tag that indicates a test suite (e.g., collection of test cases) performed with respect to a particular computing object. Other methods of detecting the set of historical development data are also possible.

Consider the following example. In certain embodiments, detecting the set of (historical) development data may include utilizing a development log for a particular streaming application. The development log may include a database, index, table, directory, or other group of organized data configured to track the development progress of a streaming application. In embodiments, the development log may include code repository data (e.g., source control library history of code check-ins and check-outs), code modification data (e.g., when and how code was changed/updated, edited), and code test data (e.g., what tests were performed on which code objects and the results of the tests). Accordingly, a code diagnostic tool may be configured to parse the information in the development log and generate a summarized output (e.g., report) of the development progress of the streaming application. For instance, a set of historical development data for a streaming application may be detected that indicates that a first code object is changed an average of 4 times per day, and that a test suite of 11 tests have been performed with respect to the first code object. Other types of development data and other methods of detecting the set of development data are also possible.

In embodiments, application development may include constructing a set of implementation code at block 612. Generally, constructing implementation code may include generating, building, editing, modifying, or revising portions of programming code (e.g., of the computing object) for a streaming application. The set of implementation code can include a collection of computer instructions configured to execute or carry-out a particular computer command, function, or operation. As described herein, in embodiments, the set of implementation code may include source code for a streaming application. As examples, the set of implementation code may include programming code for software applications configured to manage media content (e.g., video, music, images) delivery, data storage/backup, distributed computing resources, analytic services, and other computing services. In embodiments, constructing the implementation code may include adding programming code configured to implement a stream operator within a streaming application. As an example, constructing may include inserting a code module configured to introduce a pair operator (e.g., an operator configured to pair tuples from two or more streams) within a streaming application. In embodiments, constructing may include proposing one or more candidate implementation code modules to a user/developer of the streaming application for verification before implementation. Other methods of constructing implementation code are also possible.

In embodiments, application development may include configuration of a set of parameters at block 614. Configuring the set of parameters may include modifying, editing, or otherwise adjusting one or more settings, attributes, or parameters of the streaming application. In embodiments, configuring the set of parameters may include adjusting the resources allocated to a particular stream operator, changing the settings or instructions for a stream operator, or the like. For instance, parameters for a filter operator may be configured to specify particular tuples for removal from a stream of tuples (e.g., only pass tuples that are greater than 1000 bytes of data). As another example, in certain embodiments, configuring the parameters may include running one or more algorithms (e.g., configuration optimization algorithms, performance testing algorithms) with respect to the streaming application. For instance, an algorithm may be run to calculate a threshold (e.g., minimum) amount of processing resources needed to maintain a certain throughput rate for a given operator configuration, and then editing the operators of the streaming application based on the results of the calculation. Other methods of configuring the parameters are also possible.

At block 650, the set of historical development data may be established in association with the computing object. Generally, establishing can include generating, creating, storing, associating, relating, joining, correlating, or otherwise forming a link between the set of historical development data and the computing object. In embodiments, establishing the set of historical development data in association with the computing object may include assembling the information collected regarding the development history (e.g., set of code debug information, set of code testing information, set of code source information) of one or more aspects of the streaming application and linking it together with the computing object (e.g., in a particular form). For instance, as an example, linking the set of historical development data with the computing object may include tagging one or more elements of the computing object (e.g., specific operators, lines of code, functions) with call-out tags that reference specific portions of the set of historical development data (e.g., particular code modules associated with test cases, modification frequency above a threshold). In embodiments, the set of historical development data may be stored together with the computing object in a source code file for the streaming application. In embodiments, establishing may include storing the set of historical development data in a separate file that is linked with the computing object to facilitate mutual data access, retrieval, modification, and other tasks that access or utilize one or more of the set of historical development data or the computing object. Other methods of establishing the set of historical development data in association with the computing object are also possible.

Consider the following example. In embodiments, establishing may include bundling the set of historical development data together with the set of implementation code in a single digital package. For instance, the set of historical development data may be saved within the same file container as the computing object (e.g., implementation code for the computing object and the set of warning historical development data may be saved as different sheets of the same file). In certain embodiments, the set of historical development data and the computing object may be saved as separate file packages that share mutual access authorization. As an example, as described herein, the computing object may be annotated with callouts that reference particular associated portions of the set of historical development data. Accordingly, upon execution/evaluation/examination or other access to the computing object, the set of historical development data may automatically be invoked, referenced, or presented. Other methods of storing the set of historical warning data and the computing object are also possible.

At block 670, a computing artifact which has the computing object in association with the set of historical development data may be compiled. Generally, compiling may include translating, converting, interpreting, transforming, adapting or otherwise generating the computing artifact which has the computing object in association with the set of historical development data. In embodiments, compiling may include converting a set of source code (e.g., including the computing object) from a first programming language (e.g., from a high-level, human-readable programming language to a lower-level programming language such as assembly language or machine-readable code) to generate the computing artifact. The computing artifact may include a digital package, bundle, or container that includes both the computing object as well as the set of historical development data. In embodiments, the computing artifact may include an executable or binary file, streaming operator, or processing element configured to implement instructions specified by the computing object. In certain embodiments, the computing artifact may be compiled so as to facilitate performance of one or more compilation actions or execution actions based on the set of historical development data. As an example, the computing artifact may be compiled to allow for post-compilation attribute modification of one or more aspects of the computing object based on the set of historical development data (e.g., disabling a stream operator associated with a number of test cases below a threshold level). Other methods of compiling the computing artifact which has the computing object in association with the set of historical development data are also possible.

Method 600 concludes at block 699. As described herein, aspects of method 600 relate to generating a computing artifact that includes a computing object in association with a set of historical development data to facilitate streaming application development and performance. Aspects of method 600 may provide performance or efficiency benefits related to stream application deployment. As an example, the set of historical development data may be used to facilitate determination of which host nodes are appropriate for hosting particular computing objects (e.g., historical development data for a first computing object indicates thorough testing and stable code such that the first computing object is suitable for high-value workloads, while historical development data for a second computing object indicates insufficient testing such that the second computing object may not be suitable for use with high-value workloads). Altogether, leveraging historical development data for a stream computing environment may be associated with development efficiency, code reliability, and stream application performance.

Figure 7:
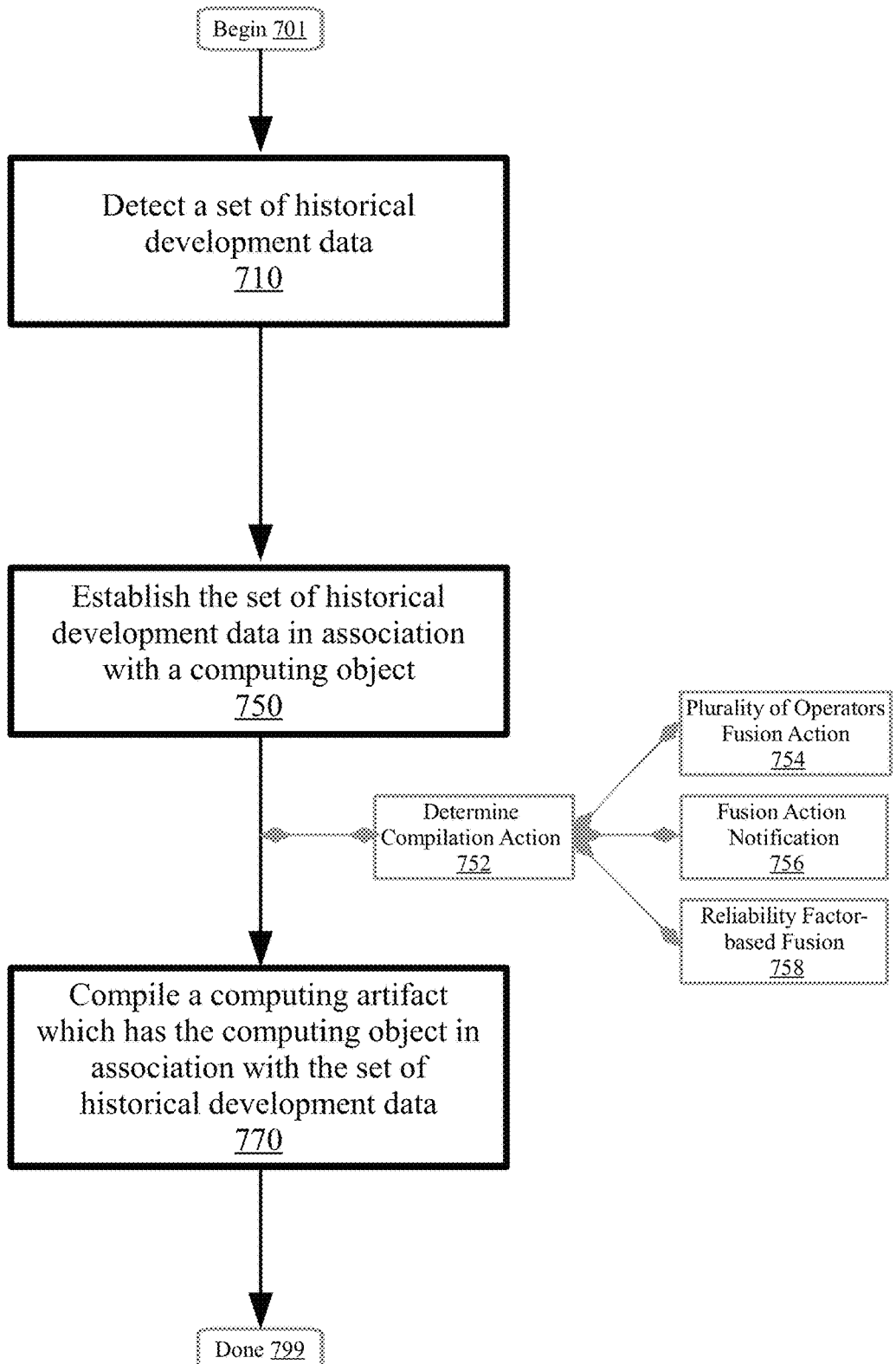
FIG. 7 is a flowchart illustrating a method for managing a set of historical development data for a stream computing environment, according to embodiments.

FIG. 7 is a flowchart illustrating a method 700 for managing a set of historical development data for a stream computing environment, according to embodiments. Aspects of FIG. 7 relate to determining and performing a compilation action based on a set of historical development data to facilitate stream application development. In embodiments, aspects of FIG. 7 may substantially correspond to other embodiments described herein and illustrated in FIGS. 1-10. At block 710, a set of historical development data related to a computing object may be detected. At block 750, a set of historical development data may be established in association with the computing object. At block 770, a computing artifact which has the computing object in association with the set of historical development data may be compiled. The method 700 may begin at block 701.

In embodiments, a compilation action may be determined based on the set of historical development data at block 752. Generally, determining may include ascertaining, computing, resolving, formulating, deriving, or otherwise identifying the compilation action. The compilation action may be a task, job, operation, activity, or other process performed with respect to the compilation phase of the code development process (e.g., of a computing object, streaming application). In embodiments, determining may include analyzing the computing object and ascertaining one or more compilation actions which may be associated with positive impacts with respect to the computing object or the set of historical development data. For example, the compilation action may include using a code analysis tool to analyze the computing artifact and determine portions of code (e.g., stream operators) that may be fused to facilitate stream application performance. Other types of compilation actions are also possible.

As described herein, determination of the compilation action may be based on the set of historical development data. In embodiments, an aspect of the set of historical development data may be identified that indicates an effect, impact, or other influence on or more candidate compilation actions. Accordingly, based on the set of historical development data, a particular compilation action may be identified (e.g., for selection) as being associated with positive impacts with respect to a computing object. As an example, the set of historical development data may indicate that two separate stream operators having similar functionality (e.g., same operator type) are both associated with a number of test cases above a threshold value (e.g., over 20 test cases). Accordingly, in embodiments, a compilation action may be determined to fuse the two stream operators together (e.g., as both operators have been thoroughly tested/are stable, a fusion operation may be determined to positively impact stream application performance). As another example, for a computing object that is associated with a code modification frequency above a threshold (e.g., more than 5 changes a day), a compilation action may be determined to prevent fusion of the computing object with other computing objects (e.g., fusion with frequently modified code may result in unstable behavior). Other methods of determining the compilation action are also possible.

In embodiments, the compilation action can include an operator fusion action at block 754. Generally, operator fusion may include the process of joining or combining a plurality of operators (e.g., streaming operators) together to form a single processing element. Operator fusion may be associated with benefits such as code simplification, processing efficiency, and resource management. In embodiments, a fusion operation corresponding to a plurality of operators may be performed. The fusion operation may include fusing one or more operators into a single processing element. As described herein, the fusion action may be based on the set of historical development data. For instance, in embodiments, operators that are associated with a set of historical development data that indicates insufficient testing, an unknown code source, or frequent modifications may be prevented from fusing with other operators. In embodiments, the nature of the set of historical development data be analyzed to determine whether fusion between particular operators may be safely and reliably performed. In embodiments, a fusion action notification may be provided at block 756. The fusion action notification may include an alert, request for verification, or other statement related to the fusion action. In embodiments, the fusion action notification may be provided to a user or developer prior to performance of the fusion action in order to inform a user of a pending operator fusion or unfusion. For instance, the fusion action notification may request the user's authorization to fuse one or more operators (e.g., operators having a set of historical development data that indicates unreliability). Other types of operator fusion actions and compilation actions beyond those described explicitly herein are also possible.

In embodiments, a plurality of operators which are indicated by the set of historical development data to have a set of reliability factors that exceed a reliability threshold may be fused at block 758. Generally, fusing can include combining, integrating, joining, linking, or otherwise merging the plurality of operators having the set of reliability factors that exceed the reliability threshold. The set of reliability factors may include a quantitative or qualitative measure, representation, expression, or indication of the safety, dependability, security, trustworthiness, or consistency of one or more stream operators. In embodiments, the set of reliability factors for the plurality of operators may be computed based on the set of historical development data. For instance, code origination data (e.g., where/by whom the code was developed), volatility (e.g., stability, number of changes), archived usage data (e.g., test coverage reports, error messages), and other information included in the set of historical development data may be analyzed and used to compute the reliability factors for one or more computing objects. For instance, stream operators that are assumed with low volatility (e.g., low number of changes per given time period), a trustworthy code source (e.g., reputable developer), a long usage history (e.g., used in a variety of stream applications over an extended time period), low error occurrence rates (e.g., less than one error every 100 uses), and positive performance metrics (e.g., functioned correctly, used moderate resources) may be associated with greater reliability factors. As described herein, aspects of the disclosure relate to fusing a plurality of operators which have a set of reliability factors that exceed a reliability threshold (e.g., benchmark reliability factor value). As an example, in response to determining that a first stream operator with a reliability factor of 76, a second stream operator with a reliability factor of 93, and a third stream operator with a reliability factor of 79 achieve a reliability threshold of 75, the three stream operators may be fused together into a single processing element. Other methods of fusing a plurality of stream operators based on reliability factors are also possible. The method 700 may conclude at block 799.

Figure 8:
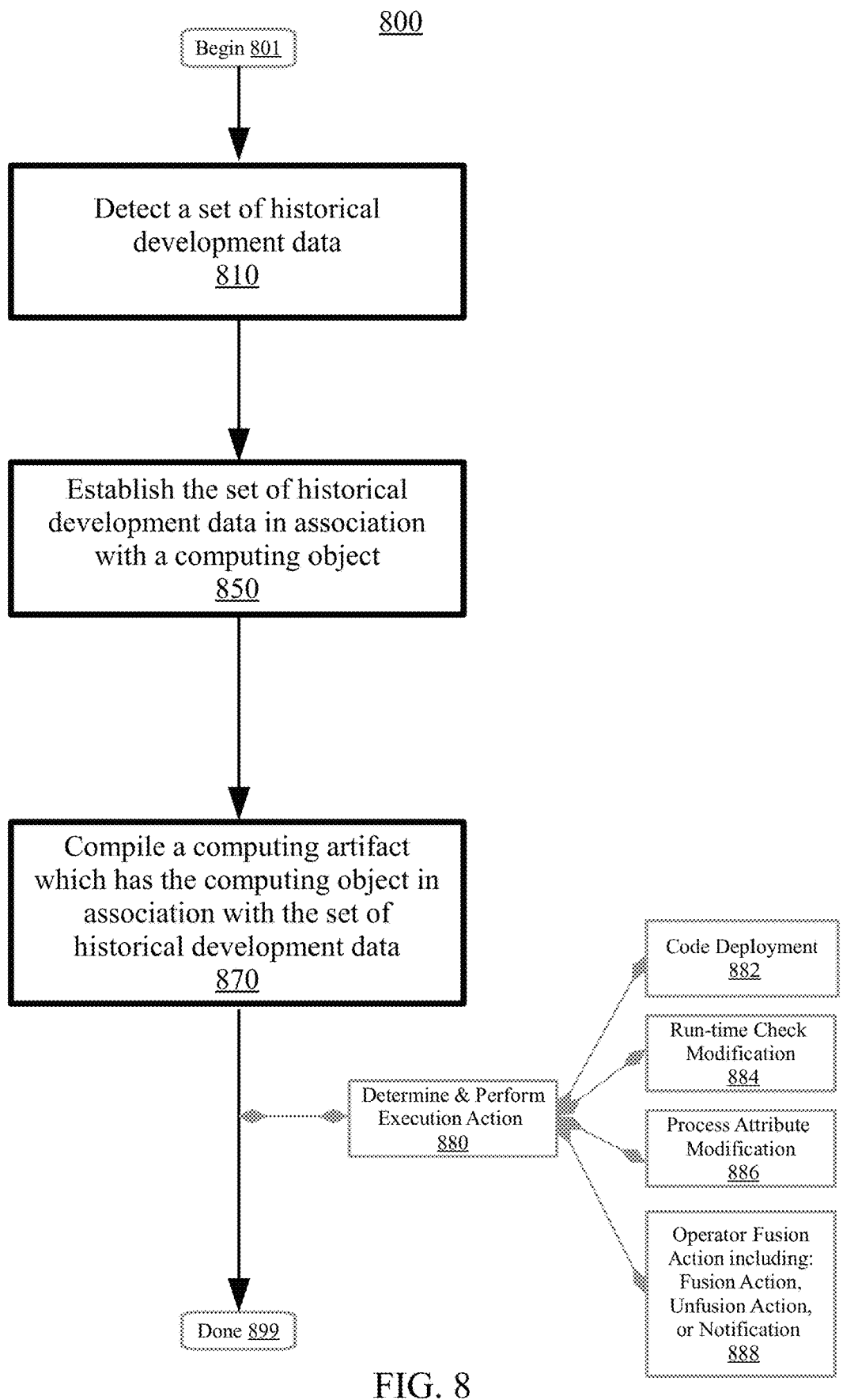
FIG. 8 is a flowchart illustrating a method for managing a set of historical development data for a stream computing environment, according to embodiments.

FIG. 8 is a flowchart illustrating a method 800 for managing a set of historical development data for a stream computing environment, according to embodiments. Aspects of FIG. 8 relate to determining and performing an execution action based on a set of historical development data to facilitate stream application performance. In embodiments, aspects of FIG. 8 may substantially correspond to other embodiments described herein and illustrated in FIGS. 1-10. At block 810, a set of historical development data related to a computing object may be detected. At block 850, a set of historical development data may be established in association with the computing object. At block 870, a computing artifact which has the computing object in association with the set of historical development data may be compiled. The method 800 may begin at block 801.

In embodiments, an execution action which pertains to the computing artifact may be determined and performed at block 880. The execution action may be determined using the set of historical development data. Generally, determining may include ascertaining, computing, resolving, formulating, deriving, or otherwise identifying the execution action. In embodiments, determining may include analyzing the computing artifact and ascertaining one or more execution actions which may be associated with positive impacts with respect to the streaming application. As an example, in response to analyzing the set of historical development data of the computing artifact, it may be ascertained that the resource allocation of the host computing environment may result in insufficient memory resources for the computing artifact (e.g., the set of historical development data may indicate that more memory resources are needed). Accordingly, an execution action to reconfigure the resource allocations for the computing artifact may be determined. In embodiments, the execution action may be performed in response to determining the execution action. Generally, performing can include implementing, carrying-out, instantiating, or executing the execution action. For instance, with reference to the previous example of a computing artifact having insufficient memory resources, performing the execution action may include analyzing the resource allocation configuration for the stream computing environment and allocating additional memory resources for use by the computing artifact. Other methods of determining and performing the execution action are also possible.

In embodiments, the execution action may include a code deployment to a set of computing units at block 882. Generally, the code deployment may include the placement, allocation, or distribution of computing artifacts, computing objects, source code, operators, processing elements, virtual machines, or other assets to the set of computing units. The set of computing units may include one or more different computing systems, containers within a computing system (e.g., virtualized runtime environments), partitions of a computing system (e.g., regions of a storage device with dedicated operating systems), a logical grouping of a computing system (e.g., directories, databases), a physical grouping of a computing system (e.g., host computing device in a distributed network), a distributed network of computing nodes, or other type of computing environment. In embodiments, the code deployment may include sending the computing artifact to a different computing environment (e.g., for execution) based on the set of historical development data. Aspects of the disclosure, in certain embodiments, relate to the recognition that the set of historical development data may indicate a potential incompatibility, irregularity, or other challenge related to deploying a particular computing artifact to a particular host (e.g., resource insufficiency, code unreliability). For instance, the set of historical development data may indicate that a computing object associated with an insufficient amount of testing (e.g., test coverage data below a threshold level), high volatility (e.g., frequent changes) or other such characteristics may not be suitable for placement on one or more compute hosts. Accordingly, in embodiments, aspects of the disclosure relate to making computing artifact deployment decisions based on the set of historical development data for a computing artifact. Other methods of code deployment are also possible.

Consider the following example. A set of historical development data for a first computing artifact may be analyzed with respect to host profile data (e.g., information regarding the performance characteristics, usage history, system resources, allocated workloads, security features, and other properties and attributes of the set of compute nodes) for a set of compute nodes. In response to analyzing the set of historical development data, it may be determined that the first computing object is not associated with any test cases (e.g., has not yet been tested), and has a plurality of breakpoints indicating an unresolved error (e.g., low reliability factor). Analyzing the host profile data for the set of compute nodes may indicate that a first compute node hosts high-value client workloads and sensitive information. As such, in certain embodiments, it may be ascertained that the first computing object may not be a good fit for the first compute node (e.g., data security concerns may be associated with placement of untested computing objects together with sensitive information). In embodiments, the host profile data may indicate that a second compute node of the set of compute nodes already hosts multiple computing objects associated with low reliability factors (e.g., reliability factors below a threshold), and does not contain any sensitive information or high-value workloads. Accordingly, in embodiments, the second compute node may be selected to host the first computing object (e.g., clustering computing objects associated with low reliability factors on the same host may be associated with reduced data loss in case of an error occurrence). Other methods of analyzing and selecting a compute node to host the first computing object are also possible.

In embodiments, the execution action may include a runtime check modification at block 884. The runtime check modification may include scanning, revising, editing, annotating, amending, adjusting, or otherwise making a change to the computing artifact at runtime (e.g., at program startup or during operation). The runtime check modification may be based on the set of historical development data. In embodiments, the runtime check modification may include adding or removing a logging mechanism. The logging mechanism may include a feature or means configured to manage auditing, fault detection, and coding error identification of the computing artifact. As an example, in certain embodiments the logging mechanism may be enabled to identify potential arithmetic overflows or invalid type casts within the computing artifact. In embodiments, the runtime check modification may include adding or removing an external process. The external process may include a computing instruction, command, operation, or other routine invoked by the computing artifact for execution by another program. For instance, one example of adding an external process may include enabling a system diagnostic monitor or performance analyzer to obtain information regarding the operating performance of the computing artifact. In certain embodiments, the runtime check modification may include adding or removing a product feature. The product feature may include a characteristic, attribute, or other aspect of the computing artifact. In embodiments, removing the product feature may include disabling a particular function (e.g., a visual effect) in order to save hardware resources. Other methods of runtime check modification are also possible.

In embodiments, the execution action may include a process attribute modification at block 886. Generally, the process attribute modification may include an adjustment, revision, or other change to an element of the computing artifact. In embodiments, the process attribute modification may include adjusting the job priority of one or more tasks of the computing artifact. For example, in a streaming application configured to analyze the performance of a set of stream operators, a job related to gathering performance metrics for the stream operators may be assigned a higher job priority than a job pertaining to tracking the destination location of the processed tuples. In certain embodiments, the process attribute modification may include adjusting the time slice (e.g., the period of time allotted for a process to run) or wait interval (e.g., the length of time the task scheduler is specified to wait for a process to respond) of a particular process of the computing artifact. As an example, in certain embodiments the time slice may be extended to reduce the processing time used by the scheduler. In embodiments, the process attribute modification may include selecting a processing thread for execution of the computing artifact. For instance, in embodiments the available processing threads may be analyzed and a processing thread with bandwidth sufficient to run the computing artifact may be selected. Other methods of process attribute modification are also possible.

In embodiments, the execution action can include an operator fusion action, an unfusion action corresponding to a plurality of operators, or a notification with respect to a fusion action or an unfusion action at block 888. As described herein, the operator fusion action may include the process of joining or combining a plurality of operators (e.g., streaming operators) together to form a single processing element. Operator fusion may be associated with benefits such as code simplification, processing efficiency, and resource management. In embodiments, the operation fusion action may include a fusion operation corresponding to a plurality of operators. The fusion operation may include fusing one or more operators into a single processing element. As described herein, the fusion action may be based on the set of historical development data. In embodiments, the nature of the historical development data may be analyzed to determine whether fusion between particular operators may be safely and reliably performed. Other methods of selecting operators for operator fusion are also possible.

In embodiments, the execution action can include an operator unfusion action. Generally, operator unfusion may include splitting a single processing element composed of multiple operators into individual operators. In embodiments, operator unfusion may be associated with benefits such as reducing operator incompatibilities (e.g., operators that operate normally while separated may cause errors if fused with operator operators), ascertaining the cause of operator failure (e.g., in the event that a processing element including multiple operators fails, it may be difficult to identify which operator was the cause) and the like. As an example, in certain embodiments, an operator may include a failed processing element composed of three individual operators. Due to the failure, the processing element may be unable to perform processing operations. Accordingly, performing the unfusion action to split the processing element may allow two of the operators to resume normal function, while the single operator that was the cause of the error may be identified and corrected. Other methods of performing the operator unfusion action are also possible.

In embodiments, the execution action may include a fusion action notification. The fusion action notification may include an alert, request for verification, or other statement related to the fusion action or the unfusion action. In certain embodiments, the fusion action notification may be provided to a user or developer prior to performance of the fusion action in order to inform the user of the pending operator fusion. For instance, the fusion action notification may request the user's authorization to fuse or unfuse one or more operators associated with a set of historical development data. Consider the following example. A particular operator may be associated with a set of historical development data that includes the following message: "unresolved error: implicit declaration of function" (e.g., a warning that may occur when a function is used in the code but no previous information regarding the function is found). In embodiments, the compiler may determine (e.g., mistakenly) that the function returns an integer and proceed. In certain scenarios, if the operator associated with this error message is fused with another operator, unexpected software behavior may result (e.g., if the function does not return an integer). Accordingly, prior to performing a fusion action that includes the operator, a fusion action notification may be provided (e.g., to a user). Other types of operator fusion actions and notification actions beyond those described explicitly herein are also possible. The method 800 may end at block 899.

Figure 9:
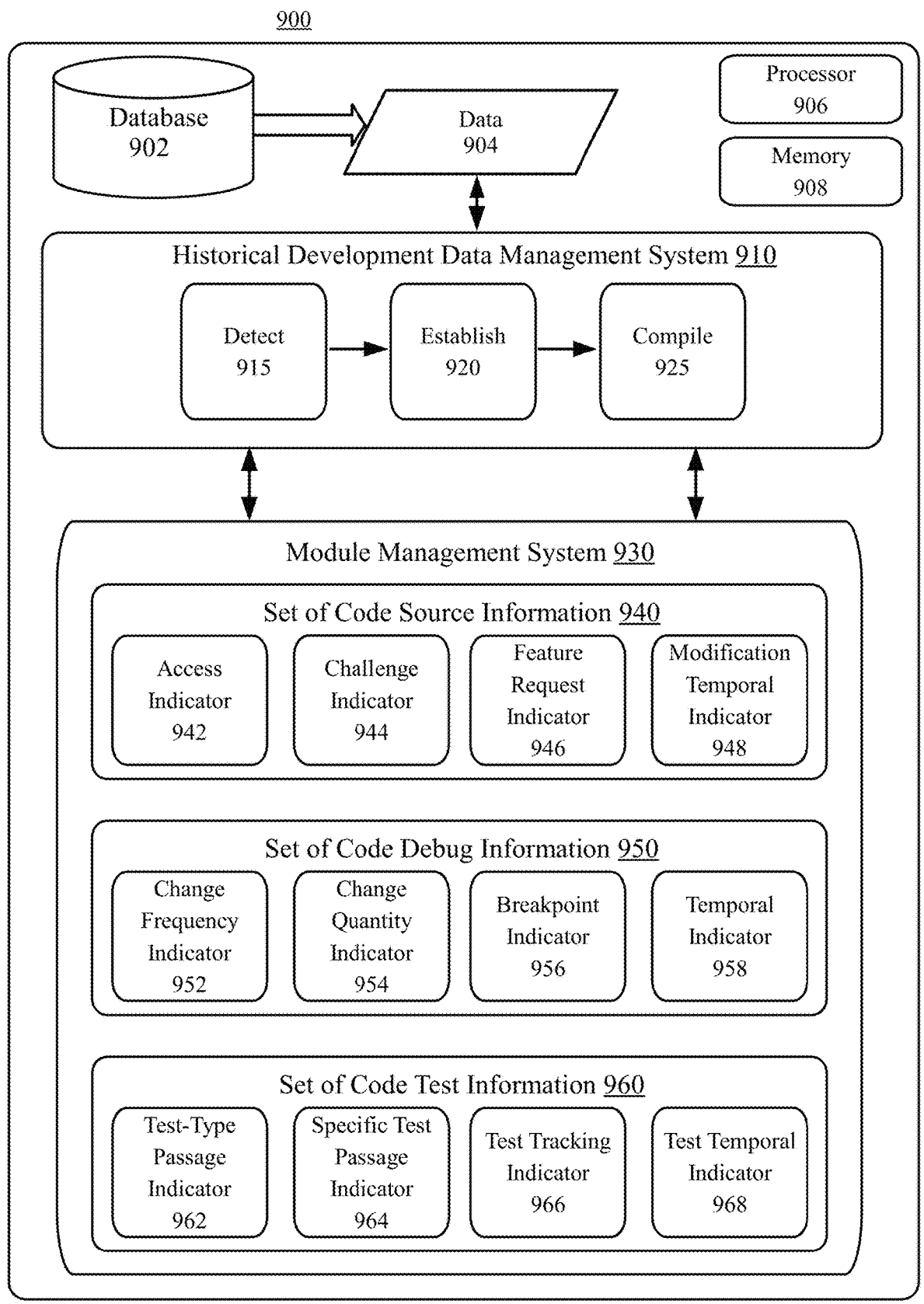
FIG. 9 depicts an example system for managing a set of historical development data for a stream computing environment, according to embodiments.

FIG. 9 depicts an example system 900 for managing a set of historical development data for a stream computing environment, according to embodiments. Aspects of FIG. 9 relate to utilizing a set of historical development data including a set of source code information 940, a set of code debug information 950, and a set of code test information 960 to facilitate deployment and fusion decisions in a stream computing environment. The example system 900 may include a processor 906 and a memory 908 to facilitate implementation of historical development data management. The example system 900 may include a database 902 (e.g., historical development data archive) configured to maintain data used for stream application management. In embodiments, the example system 900 may include a historical development data management system 910. The historical development data management system 910 may be communicatively connected to the database 902, and be configured to receive data 904 (e.g., instructions, fusion requests, compilation/execution action commands) related to historical development data management. The historical development data management system 910 may include a detecting module 915 to detect a set of historical development data related to a computing object, an establishing module 920 to establish the set of historical development data in association with the computing object, and a compiling module 925 to compile a computing artifact which has the computing object in association with the set of historical development data. The historical development data management system 910 may be communicatively connected with a module management system 930 includes a set of modules for implementing aspects of historical development data management.

In embodiments, the set of historical development data may include a set of code source information at module 940. The set of code source information may include data that identifies the source (e.g., code developer, distributor) or origination location (e.g., in-house code development, third-party code repository), or indicates other characteristics or attributes regarding the development progress, modification history, origin, or development of a computing object. In embodiments, the set of code source information may include metadata such as data tags, comments, or other annotations that indicate the individuals/organizations involved in the creation or development of a particular computing object, the number of times the computing object was accessed or modified, error/bug history, usage history, or the like. As an example, a particular computing object may be associated with a modification tag that indicates that it was edited by User A on Aug. 11, 2014. As another example, a computing object may include a digital signature indicating that it was downloaded from a third-party code repository SoftwareHub. Other types of code source information are also possible.

In embodiments, the set of code source information may include an access indicator which indicates a quantitative value related to frequency of utilization of the computing object at module 942. The access indicator may include a representation of how frequently (e.g., number of uses per given time period) a particular computing object has been utilized. The access indicator may indicate how many times a computing object has been called/invoked, incorporated within a software application, used by an administrator, or otherwise selected as part of an action. The access indicator may provide a quantitative representation (e.g., count) of the utilization frequency of the computing object (e.g., 8 times in 1 day, 94 times in one week). The utilization frequency may be represented as an absolute value (e.g., lifetime utilization count of 356 times), as an average over a specified time span (e.g., average of 32 accesses per month), or other format. In embodiments, the access indicator may indicate how many times the computing object has been checked-in or checked-out from a code repository. Consider the following example. A code repository log may be accessed, and it may be determined that the computing object has been checked-out (e.g., downloaded from a shared code repository) 14 times in a one week period, and checked in (e.g., committed/saved back to the shared code repository) 9 times in the one week period. Accordingly, in embodiments, an access indicator for the computing object may indicate that the computing object was utilized 23 times in one week (e.g., the sum of check-ins and check-outs for the computing object). Other types of access indicator are also possible.

In embodiments, the set of code source information may include a challenge indicator which indicates a quantitative value of reported potential bugs at module 944. The challenge indicator may include a representation of the number of errors, bugs, glitches, or irregularities associated with a particular computing object. The challenge indicator may indicate a count of how many times an error has occurred with respect to a computing object (e.g., with respect to pre-compilation testing or post-computation use). In certain embodiments, the challenge indicator may record the type, nature, severity, and resolution of the errors detected for a computing object. As examples, the challenge indicator may indicate the number of lifetime errors (e.g., total of 31 errors), the number of unique errors (e.g., 6 unique bugs), the absolute or average number of errors over a specified time span (e.g., 11 bugs in the last week, average of 9 bugs a week), or the like. In embodiments, the challenge indicator may indicate the reported number of potential bugs (e.g., authorized program analysis reports) associated with a computing object. Consider the following example. A particular computing object be incorporated within a variety of streaming applications at various stages of development (e.g., development testing phase, shipped product phase). In certain embodiments, 6 reports from clients (e.g., using the shipped product) and 19 reports from developers (e.g., testing the application) may be received that indicate that a bug or error occurred with respect to the particular computing object. Accordingly, a challenge indicator for the particular computing object may indicate 24 reported potential bugs for the computing object. Other types of challenge indicator are also possible.

In embodiments, the set of code source information may include a feature request indicator which indicates a quantitative value of feature requests associated with the computing object at module 946. The feature request indicator may include a count of how many times particular features have been requested for implementation in the streaming application. In embodiments, the feature request indicator may include a quantitative value (e.g., count, integer) for each respective feature that has been requested (e.g., by development staff, testers, clients, consumers, managers, company executives). The feature request indicator may be organized or arranged to represent the feature request count sorted by feature type (e.g., performance-related requests, user-interface related requests), requester demographic (e.g., developer, client) or the like. For instance, the feature request indicator may indicate that a request for "multitasking support" has been requested 11 times (e.g., by clients), a request for "past version backwards compatibility" has been requested 18 times (e.g., by testers) and a request for "in-application transactions" has been requested 8 times (e.g., by executives). In embodiments, the feature request indicator may indicate the total number of feature requests associated with a particular computing object (e.g., 37). Other types of feature request indicator are also possible.

In embodiments, the set of code source information may include a modification temporal indicator which indicates when the computing object was modified at module 948. The modification temporal indicator may include a tag, annotation, or other representation of the time and date when the computing object was revised, edited, adjusted, or otherwise changed. In embodiments, the temporal indicator may include a modification log that records the time and date of each change to the computing object (e.g., first change at 11:16 AM, Jan. 9, 2013, second change at 3:42 PM Jan. 9, 2013). In certain embodiments, the temporal indicator may indicate how recently the computing object was modified. For instance, the temporal indicator may express the time and date when the computing object was modified (e.g., 4:09 PM, Nov. 5, 2015) or the time since the last modification (e.g., 21 minutes, 3 days, 6 weeks). Other types of modification temporal indicator are also possible.

In embodiments, aspects of the disclosure relate to utilizing one or more aspects of the set of code source information in combination with each other or other aspects described herein (e.g., set of code debug information, set of code test information). As an example, the modification temporal indicator may be used together with the challenge indicator to indicate how recently a particular glitch or error occurred with respect to a particular computing object. In this way, one or more aspects of the historical development data may be leveraged together with other features described herein to facilitate deployment decisions, fusion decisions, and other usage configurations for the streaming application. Other combinations besides those described explicitly herein are also possible.

In embodiments, the set of historical development data may include a set of code debug information at module 950. The set of code debug information may include data that relates to the context, environment, tools, techniques, results, history, and other factors regarding how debugging operations have been performed with respect to a particular computing object. The set of code debug information may include data regarding the types of debugging tasks that have been performed (e.g., breakpoint based methods, static code analysis tools, syntax checkers), the amount of resources that have been used with respect to debugging (e.g., time spent, computing resources used, number of individuals working on debugging), and the results of the debugging operations (e.g., error resolution rate, error re-occurrence rate). In embodiments, the set of code debug information may include data regarding debugging operations that were performed in the integrated development environment (IDE) of a software application (e.g., trial and error operator fusion tests). Other types of code debug information are also possible.

In embodiments, the set of code debug information may include a change frequency indicator which indicates a quantitative value related to the frequency of modification to the computing object at module 952. The change frequency indicator may include a representation of how frequently (e.g., number of changes per given time period) a particular computing object has been modified. The change frequency indicator may indicate how many times a computing object has been adjusted, revised, altered, or otherwise changed. The change frequency indicator may provide a quantitative representation (e.g., count) of the change frequency of the computing object (e.g., 14 times in one day, 130 times in one week). The change frequency indicator may be represented as an absolute value (e.g., lifetime change amount of 624 times), as an average over a specified time span (e.g., average of 84 changes per month), or other format. As an example, the change frequency indicator may indicate how many changes (e.g., attempts) have been made to revise a computing object (e.g., to fix an error) as part of a debugging process. For instance, the change frequency indicator may indicate that particular computing object is modified an average of 13 times a week for an 8 month time period (e.g., indicating an ongoing, unresolved error, such that the particular computing object may not be suitable for fusion with other operators). Other types of change frequency indicator are also possible.

In embodiments, the set of code debug information may include a change quantity indicator which indicates a quantitative value related to an extensiveness of modification to the computing object at module 954. The quantity indicator may include a representation of the degree or extent (e.g., how much) to which one or more computing objects have been modified or debugged. In embodiments, the quantity indicator may include a count of how many lines, (e.g., 47 lines), functions (e.g., 12 functions), variables (e.g., 22 variables), code modules (e.g., 4 code modules), or other aspects of programming code have been edited or debugged. In embodiments, the quantity indicator may include a number of individual edits performed with respect to a computing object in a specified time frame. As an example, the quantity indicator may indicate that a total of 34 lines of code of a particular computing object have been changed (e.g., debugged) in a 48 hour time period. In embodiments, the quantity indicator may indicate the number of bugs/errors resolved with respect to a computing object. As an example, the quantity indicator may state that a total of 16 errors have been resolved for a particular computing object. Other types of change quantity indicator are also possible.

In embodiments, the set of code debug information may include a breakpoint indicator which indicates a quantitative value of breakpoints set in association with the computing object at module 956. In embodiments, the breakpoint indicator may indicate how many times a breakpoint has been placed in a portion of programming code. For instance, the breakpoint indicator may show that a total of 33 breakpoints have been used in conjunction with a first computing object. In embodiments, the breakpoint indicator may indicate how many times breakpoints have been triggered with respect to a portion of computing code. Consider the following example. A breakpoint such as a watchpoint (e.g., type of breakpoint configured to stop execution of an application when the value of a specified expression achieves a particular value) may be established with respect to a particular computing object such that Line 348 through Line 366 of the computing object are configured to execute one at a time unless one or more expressions return a value of "False" when executed (e.g., indicating the presence of an error or bug). Accordingly, execution of the computing object may be initiated, and may proceed without error until Line 359, at which point a value of "False" is returned and the watchpoint is triggered. In response to triggering of the watchpoint, the breakpoint indicator may be incremented by 1 to represent the number of times a watchpoint has been triggered with respect to the computing object. The breakpoint indicator may maintain an ongoing count of breakpoint triggers for one or more computing objects of the streaming application (e.g., first computing object has a breakpoint indicator of 59, second computing object has a breakpoint indicator of 6). Other types of breakpoint indicator are also possible.

In embodiments, the set of code debug information may include a temporal indicator which indicates a quantitative value related to an amount of debugging performed at module 958. The temporal indicator may represent or indicate the amount of time that has been allocated to debugging operations (e.g., 6 hours, 15 hours, 4 days). In embodiments, the temporal indicator may indicate the amount of time that code diagnostic tools have been actively performing debugging operations. For instance, the temporal indicator may show that a code diagnostic tool has been performing debugging operations on a particular computing object for 9 hours. In embodiments, the temporal indicator may indicate the amount of human work-hours that have been spent on debugging tasks (e.g., 3 debuggers working 8 hours a day for 3 days resulting in 24 hours of total debugging time). In certain embodiments, the temporal indicator may be linked with a billing system, such that the number of hours spent debugging may be metered, and an invoice may be generated based on the time spent debugging. Other types of temporal indicator are also possible.

In embodiments, aspects of the disclosure relate to utilizing one or more aspects of the set of code debug information in combination with each other or other aspects described herein (e.g., set of code source information, set of code test information). As an example, the breakpoint indicator may be used together with the access indicator to indicate how many breakpoints have been set for a computing object with respect to the total number of times the computing object has been accessed (e.g., checked-in, checked-out from a code repository). In this way, one or more aspects of the historical development data may be leveraged together with other features described herein to facilitate deployment decisions, fusion decisions, and other usage configurations for the streaming application. Other combinations besides those described explicitly herein are also possible.

In embodiments, the set of historical development data may include a set of code test information at module 960. The set of code test information may include data that relates to the environment, methodologies, tools, techniques, results, and other factors regarding how one or more portions of code were tested (e.g., during development). The set of code test information may include data regarding the test techniques that were performed (e.g., static testing, dynamic testing, white-box testing, black-box testing), the levels of testing that were performed (e.g., unit testing, integration testing, component interface testing, system testing), the amount of tests that were performed with respect to particular computing objects, the results of the performed tests, and other information pertaining to the testing process. In embodiments, the set of code test information may include a testing log that records test suites and results for different computing objects. Other types of code testing information are also possible.

In embodiments, the set of code test information may include a test-type passage indicator which indicates a quantitative value related to passage of types of tests at module 962. In embodiments, the test-type passage indicator may include a representation of the test passage rate of one or more computing objects with respect to different types of development tests. In embodiments, the test-type passage indicator may be expressed as an absolute value of the number of tests passed of a particular test type (e.g., 30 compatibility tests passed) or a relative value of the number of tests passed with respect to the total number of tests performed of a particular test type (e.g., 74% passage rate for regression tests). In embodiments, the test-type passage indicator may include an index of a number of different test types and the passage rate of various computing objects with respect to each test type. As an example, the test-type indicator may indicate that a first computing object has a 17% passage rate with respect to alpha testing, a 44% passage rate with respect to beta testing, a 68% passage rate with respect to continuous testing, and an 85% passage rate with respect to software performance testing. Other types of test-type indicator are also possible.

In embodiments, the set of code test information may include a specific test passage indicator which indicates a quantitative value related to passage of specific tests performed on the computing object at module 964. The specific test passage indicator may indicate a list of specific tests (e.g., performance tests, load tests) that have been passed by particular computing objects. For instance, in embodiments, a particular portion of computing code may be tagged, marked, or otherwise annotated with a note that lists the specific tests that have been passed by that portion of computing code. In embodiments, the specific test passage indicator may be linked to a test suite (e.g., validation suite) that includes a list of the specific tests that are planned to be performed with respect to a particular computing object, as well as those tests that have already been performed (e.g., together with the pass/fail outcome of the test). As an example, a first computing object may be associated with a specific test passage indicator that indicates that the first computing object has passed a bandwidth handling capacity test, a regulation acceptance test, and a load test, but has failed a runtime error detection test, a stress test, and a regression test. Other types of specific test passage indicators are also possible.

In embodiments, the set of code test information may include a test tracking indicator which indicates a quantitative value of tests performed on the computing object at module 966. In embodiments, the test tracking indicator may indicate how many times a computing object has been tested, assessed, evaluated, or otherwise examined. The test tracking indicator may provide a quantitative representation (e.g., count) of the testing frequency of the computing object (e.g., 6 times in an hour, 121 times a week). The test tracking indicator may be represented as an absolute value (e.g., lifetime test count of 240 times) as an average over a specified time span (e.g., average of 24 tests per month), or other format. In embodiments, the test tracking indicator may indicate how many unique tests were performed on a computing object. As an example, a particular computing object may be associated with a test tracking indicator that indicates that the computing object has been tested a total of 79 times by 11 unique tests. Other types of test tracking indicator are also possible.

In embodiments, the set of code test information may include a test temporal indicator which indicates when the computing object was tested at module 968. The test temporal indicator may include a tag, annotation, or other representation of the time and date when a computing object was tested, assessed, evaluated, or otherwise examined. In embodiments, the test temporal indicator may include a testing log that records the time and date of each testing operation performed on a computing object (e.g., first test at 2:19 PM, April 24th, second test at 9:41 AM, April 25th). In certain embodiments, the test temporal indicator may indicate how recently the computing object was tested. For instance, the test temporal indicator may express the time and date when the computing object was tested (e.g., 10:20 AM, Sep. 4, 2015) or the time since the last testing operation (e.g., 38 minutes, 7 days, 2 weeks). Other types of test temporal indicator are also possible.

In embodiments, aspects of the disclosure relate to utilizing one or more aspects of the set of code test information in combination with each other or other aspects described herein (e.g., set of code source information, set of code debug information). As an example, the test tracking indicator may be used together with both the change frequency indicator and the challenge indicator to indicate when tests were performed on a particular computing object, and whether modifications and error reports with respect to the computing object increased or decreased after performance of the testing (e.g., to discern whether or not the tests may have resolved an error or other issue. In this way, one or more aspects of the historical development data may be leveraged together with other features described herein to facilitate deployment decisions, fusion decisions, and other usage configurations for the streaming application. Other combinations besides those described explicitly herein are also possible.

As described herein, the set of historical development data (e.g., set of code source information, set of code debug information, set of code test information) may be used to determine deployment hosts and fusion operations for one or more computing objects. For instance, computing objects that have passed a number of tests that achieves a test threshold (e.g., as indicated by the test-type passage operator), have a change frequency below a change frequency threshold (e.g., as indicated by the change frequency indicator), or have a number of potential bug reports below an error threshold (e.g., as indicated by the challenge indicator) may be selected for deployment to particular host nodes (e.g., nodes requiring safe, reliable code) or fusion with other stream operators, while computing objects that are not thoroughly tested (e.g., number of tests below a threshold), are associated with frequent changes (e.g., indicating volatility/instability), or have a high number of error reports may be selected for use with lower-priority workloads. Other methods of making deployment and fusion decisions based on the set of historical development data are also possible.

Consider the following example. A first computing object may be associated with a set of historical development information that indicates that it was developed by a team of experienced software engineers at a large company, has a test passage rate of 92% based on a test suite of 431 tests, and has a change frequency of 3 changes per year. Accordingly, these factors may be weighted, and a reliability factor for the first computing object of "87" may be calculated (e.g., the first computing object is determined to be substantially safe, secure, reliable, or otherwise trustworthy). As another example, a second computing object may be associated with a set of historical development information that indicates it is a code toolkit that was developed by an unknown individual and downloaded from a third-party code toolkit repository. The second computing object may have a test passage rate of 18% based on a test suite of 39 tests, and have a change frequency of 611 changes per year. In embodiments, these factors may be weighted, and a reliability factor for the second computing object of "17" may be calculated. Based on the calculated reliability factors, deployment and fusion decisions may be made for the first and second computing objects. For instance, the first computing object may be selected for allocation to a host computing node configured to handle high-priority client workloads or fusion with one or more stream operators (e.g., the high reliability score indicates substantial confidence/dependability with respect to the first computing object). As another example, the second computing object may be selected for allocation to a host computing node configured to handle low-priority testing workloads, or may be prevented from fusing with one or more stream operators (e.g., the low reliability score may indicate a lack of confidence/dependability with respect to the second computing object). Other methods of using the set of historical development data to make deployment and fusion decisions are also possible.

Figure 10:
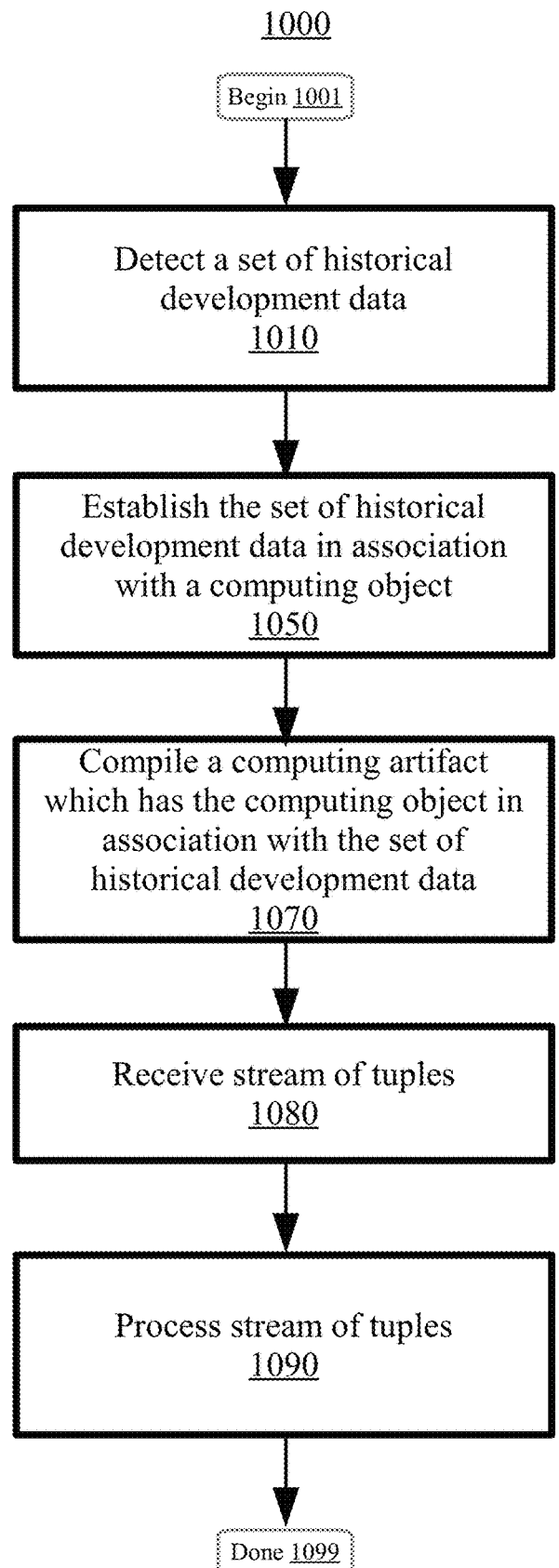
FIG. 10 is a flowchart illustrating a method for managing a set of historical development data for a stream computing environment, according to embodiments.

FIG. 10 is a flowchart illustrating a method 1000 for managing a set of historical development data for a stream computing environment, according to embodiments. Aspects of FIG. 10 relate to receiving and processing a set of tuples. In embodiments, aspects of FIG. 10 may substantially correspond to other embodiments described herein and illustrated in FIGS. 1-10. At block 1010, a set of historical development data related to a computing object may be detected. At block 1050, a set of historical development data may be established in association with the computing object. At block 1070, a computing artifact which has the computing object in association with the set of historical development data may be compiled. The method 1000 may begin at block 1001.

At block 1080, a stream of tuples is received. The stream of tuples may be processed by a plurality of processing elements (e.g., stream operators) operating on a set of compute nodes (e.g., in a distributed computing environment). The stream of tuples may be received consistent with the description herein including FIGS. 1-10. Current/future processing by the plurality of processing elements may be performed consistent with the description herein including FIGS. 1-10. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1090. The stream of tuples may be processed by the plurality of processing elements operating on the set of compute nodes. The stream of tuples may be processed consistent with the description herein including FIGS. 1-10. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. The method 1000 may end at block 1099.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of managing a set of development data for a stream computing environment, the method comprising:
    detecting, related to a computing object, the set of development data which is derived from application development for utilization in the stream computing environment, wherein the set of development data includes a set of code source information that identifies a developer of the computing object;
    establishing the set of development data in association with the computing object;
    compiling a computing artifact which has the computing object in association with the set of development data;
    determining, at runtime and using the set of development data, an execution action which pertains to the computing artifact; and
    performing, at runtime, the execution action which pertains to the computing artifact, wherein performing the execution action comprises post-compilation attribute modification of one or more aspects of the computing object based on the development data.

2. The method of claim 1, wherein the computing object includes a set of implementation code, and wherein application development is selected from the group consisting of: construction of implementation code, and configuration of a set of parameters.

3. The method of claim 1, further comprising:
    determining, based on the set of development data, a compilation action.

4. The method of claim 3, wherein the compilation action includes an operator fusion action, and wherein the operator fusion action is selected from the group consisting of: a fusion action corresponding to a plurality of operators, and a notification with respect to the fusion action.

5. The method of claim 3, further comprising:
    fusing a plurality of operators which the set of development data indicates have a set of respective reliability factors that exceeds a reliability threshold.

6. The method of claim 1, wherein the execution action includes a code deployment to a set of computing units.

7. The method of claim 1, wherein the execution action includes a run-time check modification.

8. The method of claim 1, wherein the execution action includes a process attribute modification.

9. The method of claim 1, wherein the execution action includes an operator fusion action, and wherein the operator fusion action is selected from the group consisting of: a fusion action corresponding to a plurality of operators, an unfusion action corresponding to the plurality of operators, and a notification with respect to at least one of: the fusion action, or the unfusion action.

10. The method of claim 1, wherein the set of code source information is selected from the group consisting of: an access indicator which indicates a quantitative value related to frequency of utilization of the computing object, a challenge indicator which indicates a quantitative value of reported potential bugs associated with the computing object, a feature request indicator which indicates a quantitative value of feature requests associated with the computing object, wherein the quantitative value of features requests indicates a count of how many times a particular feature has been requested, and a modification temporal indicator which indicates when the computing object was modified.

11. The method of claim 1, wherein the set of development data includes a set of code debug information.

12. The method of claim 11, wherein the set of code debug information is selected from the group consisting of: a change frequency indicator which indicates a quantitative value related to frequency of modification to the computing object, a change quantity indicator which indicates a quantitative value related to an extensiveness of modification to the computing object, a breakpoint indicator which indicates a quantitative value of breakpoints set in association with the computing object, and a temporal indicator which indicates a quantitative value related to an amount of debug performed.

13. The method of claim 1, wherein the detecting, the establishing, and the compiling each occur in an automated fashion without user intervention.

14. The method of claim 1, wherein the set of development data includes a set of historical development data, further comprising:
receiving a stream of tuples to be processed by a set of processing elements which includes the computing artifact and operates on a set of compute nodes; and
processing, using the set of processing elements operating on the set of compute nodes, the stream of tuples.

15. The method of claim 1, wherein the set of code source information comprises a challenge indicator that indicates a quantitative value of potential bugs associated with the computing object and wherein the quantitative value indicates the severity of a potential bug.

16. The method of claim 1, wherein the artifact is a deployable artifact that includes a set of processing elements and an application description file.

17. A system for managing a set of development data for a stream computing environment, the system comprising:
a memory having a set of computer readable computer instructions, and
a processor for executing the set of computer readable instructions, the set of computer readable instructions including:
detecting, related to a computing object, the set of development data which is derived from application development for utilization in the stream computing environment, wherein the set of development data includes a set of code source information that identifies an origination location of the computing object;
establishing the set of development data in association with the computing object;
compiling a computing artifact that includes both the computing object and the set of development data;
determining, at runtime and using the set of development data, an execution action which pertains to the computing artifact; and
performing, at runtime, the execution action which pertains to the computing artifact, wherein performing the execution action comprises post-compilation attribute modification of one or more aspects of the computing object based on the development data;
wherein the set of code source information comprises a feature request indicator which indicates a quantitative value of feature requests associated with the computing object, wherein the quantitative value of features requests indicates a count of how many times a particular feature has been requested for implementation in the streaming computing environment by a person.

18. A computer program product for managing a set of development data for a stream computing environment, the computer program product comprising a computer readable storage medium having program instructions embodied therewith, wherein the computer readable storage medium is not a transitory signal per se, the program instructions executable by a processor to cause the processor to perform a method comprising:
detecting, related to a computing object, the set of development data which is derived from application development for utilization in the stream computing environment, wherein the set of development data includes a set of code source information that identifies that the computing object originated from in-house development;
establishing the set of development data in association with the computing object;
compiling a computing artifact which has the computing object in association with the set of development data;
determining, at runtime and based on the development data, an execution action which pertains to the computing artifact; and
performing, based on the determining, the execution action at runtime, wherein performing the execution action comprises post-compilation attribute modification of one or more aspects of the computing object based on the development data.

* * * * *